(12) United States Patent
Kawai

(10) Patent No.: US 9,494,932 B2
(45) Date of Patent: Nov. 15, 2016

(54) MONITORING DEVICE, MONITORING METHOD, AND RECORDING MEDIUM

(71) Applicant: OMRON Corporation, Kyoto-shi, Kyoto (JP)

(72) Inventor: Wakahiro Kawai, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/424,235

(22) PCT Filed: Aug. 21, 2013

(86) PCT No.: PCT/JP2013/072237
§ 371 (c)(1),
(2) Date: Feb. 26, 2015

(87) PCT Pub. No.: WO2014/041971
PCT Pub. Date: Mar. 20, 2014

(65) Prior Publication Data
US 2015/0220084 A1 Aug. 6, 2015

(30) Foreign Application Priority Data
Sep. 13, 2012 (JP) ................................. 2012-201975

(51) Int. Cl.
*G05B 23/02* (2006.01)
*G05B 23/00* (2006.01)
*H04Q 9/00* (2006.01)

(52) U.S. Cl.
CPC ........... *G05B 23/00* (2013.01); *G05B 23/0235* (2013.01); *G05B 23/0272* (2013.01); *H04Q 9/00* (2013.01)

(58) Field of Classification Search
CPC .............. G05B 23/00; G05B 23/0272; G05B 23/0235; H04Q 9/00
See application file for complete search history.

(56) References Cited

U.S. PATENT DOCUMENTS

| 5,255,208 A | 10/1993 | Thakore et al. |
| 6,587,812 B1 | 7/2003 | Takayama |

(Continued)

FOREIGN PATENT DOCUMENTS

| CN | 101135614 A | 3/2008 |
| CN | 201985621 U | 9/2011 |

(Continued)

OTHER PUBLICATIONS

International Search Report issued in PCT/JP2013/072237 mailed on Nov. 12, 2013 (4 pages).

(Continued)

*Primary Examiner* — Erin File
(74) *Attorney, Agent, or Firm* — Osha Liang LLP

(57) ABSTRACT

A monitoring device includes: a physical quantity acquisition section for acquiring physical quantities indicative of a state of a device; an abnormality determination section for determining, in accordance with whether or not the acquired physical quantities fall within a predetermined range, whether or not there is an abnormality; an abnormal waveform data generation section for, in a case where the abnormality determination section determines that there is an abnormality, generating abnormal waveform data indicative of a change over time in the physical quantities acquired during an abnormal waveform period containing at least a period from a point in time at which the abnormality determination section determines that there is an abnormality to a point in time at which a predetermined accumulation time elapsed; and a reporting section for causing a display section to display an abnormal waveform indicated by the abnormal waveform data.

7 Claims, 8 Drawing Sheets

(56) References Cited

U.S. PATENT DOCUMENTS

| | | |
|---|---|---|
| 6,629,009 B1 | 9/2003 | Tamaki |
| 2008/0059119 A1 | 3/2008 | Hashimoto |
| 2009/0197354 A1 | 8/2009 | Lin et al. |
| 2010/0023156 A1 | 1/2010 | Trepina et al. |
| 2011/0224932 A1 | 9/2011 | Huet et al. |
| 2011/0238372 A1 | 9/2011 | Akimoto et al. |
| 2012/0078670 A1* | 3/2012 | Yamamura ......... G05B 19/4184 705/7.11 |
| 2012/0109582 A1 | 5/2012 | Moriya et al. |
| 2013/0331959 A1 | 12/2013 | Kawai |
| 2014/0123740 A1* | 5/2014 | Yoshikawa ........ B23Q 17/0961 73/104 |
| 2014/0247055 A1* | 9/2014 | Lee ..................... G01R 31/02 324/539 |

FOREIGN PATENT DOCUMENTS

| | | |
|---|---|---|
| CN | 202147217 U | 2/2012 |
| CN | 102369491 A | 3/2012 |
| EP | 2372481 A2 | 10/2011 |
| JP | 63-14205 A | 1/1988 |
| JP | 7-28522 A | 1/1995 |
| JP | 2000-210800 A | 8/2000 |
| JP | 2000-347897 A | 12/2000 |
| JP | 2003-296851 A | 10/2003 |
| JP | 2005-241089 A | 9/2005 |
| JP | 2007-135265 A | 5/2007 |
| JP | 2007-147530 A | 6/2007 |
| JP | 2009-054843 A | 3/2009 |
| JP | 2010-223645 A | 10/2010 |
| JP | 2010-250384 A | 11/2010 |
| JP | 2011-008403 A | 1/2011 |
| JP | 2011-135697 A | 7/2011 |
| JP | 2011-187088 A | 9/2011 |
| JP | 2011-209798 A | 10/2011 |
| TW | 542980 B | 7/2003 |
| TW | 200935490 A | 8/2009 |
| TW | 201008700 A1 | 3/2010 |
| TW | 201128183 A1 | 8/2011 |
| TW | 201129885 A1 | 9/2011 |

OTHER PUBLICATIONS

Written Opinion of the International Searching Authority issued in PCT/JP2013/072237 mailed on Nov. 12, 2013 (5 pages).
International Preliminary Report on Patentability from PCT/JP2013/072237 mailed on Jan. 6, 2015 (12 pages).
Extended European Search Report issued in corresponding European Application No. 13836727.1 dated Sep. 15, 2015 (6 pages).
English translation of International Preliminary Report on Patentability issued in corresponding International Application No. PCT/JP2013/072237 dated Apr. 2, 2015 (10 pages).
Office Action issued in corresponding Taiwanese Application No. 102129938, mailed Dec. 29, 2014 (14 pages).
Office Action issued in corresponding Japanese Application No. 2012-201975 dated Mar. 1, 2016 (2 pages).
Office Action issued in conterpart Chinese Application No. 201380044320.0 dated May 31, 2016 (25 pages).

* cited by examiner

US 9,494,932 B2

MONITORING DEVICE, MONITORING METHOD, AND RECORDING MEDIUM

TECHNICAL FIELD

The present invention relates to a monitoring device, a monitoring method, a program, and a recording medium by each of which a state of a device such as a production device is monitored and an abnormality is reported.

BACKGROUND ART

There is a case where a production device which processes or assembles a product, a component, or the like cannot meet a desired standard when originally achieved processing accuracy, heating performance, and the like change due to a change over time caused by operation of the production device. Examples of the change over time caused by operation include wear, damage, deterioration, and trouble of a component, and looseness of a fastening section. In a case where the production device cannot meet the desired standard, there occurs a problem such as an increase in percent defective, an increase in frequency of a shutdown, or an increase in amount of electric power consumption. In view of this, in order to respond to such a problem, (1) components are replaced at a timing at which an operating time or the number of times of use exceeds a set value, or (2) maintenance for inspection and repair is carried out at regular intervals by stopping the operation.

However, according to a method in which components are replaced in accordance with an operating time or the number of times of use, a state of wear or deterioration of a component varies depending on a state of use of a device. This may cause a case where a component which is sufficiently usable is wastefully disposed of, or, conversely, a case where deterioration of a component progresses than expected, so that a product percent defective increases, or a device suddenly stops. Meanwhile, according to a method in which maintenance is carried out at regular intervals, a device is stopped during the maintenance, so that production efficiency decreases.

Under the circumstances, there has been known a technique for measuring a physical quantity that changes by operation of a device, detecting presence or absence of an abnormality by comparison of the physical quantity and a preset threshold, and reporting an abnormality to a worker at a timing at which the abnormality is detected. Examples of a known method include: a method using, as a physical quantity, a result of sensing a vibration, an electric current, a temperature, or the like of a device (see Patent Literature 1), a method using a torque of a drive motor (see Patent Literature 2), a method using a pressure (see Patent Literature 3), and a method using electric power (Patent Literature 4).

CITATION LIST

Patent Literatures

Patent Literature 1
Japanese Patent Application Publication, Tokukaisho, No. 63-14205 A (Publication Date: Jan. 21, 1998)
Patent Literature 2
Japanese Patent Application Publication, Tokukai, No. 2011-135697 A (Publication Date: Jul. 7, 2011)
Patent Literature 3
Japanese Patent Application Publication, Tokukai, No. 2005-241089 A (Publication Date: Sep. 8, 2005)
Patent Literature 4
Japanese Patent Application Publication, Tokukai, No. 2007-135265 A (Publication Date: May 31, 2007)

SUMMARY OF INVENTION

Technical Problem

However, there is a case where a physical quantity fluctuates also depending on an operational state and/or a processing condition of a device. There is also a case where a state of a physical quantity temporarily becomes an abnormal state from some cause, but thereafter the cause is naturally solved, so that the state of the physical quantity returns to a normal state. According to the techniques disclosed in Patent Literatures 1 through 4, the abnormality is reported to the worker at the timing at which the abnormality is detected by comparison of the physical quantity and the threshold. Thus, such a technique causes a problem such that, also in a case where there is no particular problem with the device and it is unnecessary to immediately respond to the device, the abnormality is frequently reported to the worker, so that reported information is less reliable. Further, at the timing at which the abnormality is detected, it is difficult to determine whether or not the abnormality leads to future trouble, or whether or not the abnormality is merely an unexpected abnormality and does not lead to future trouble.

The present invention has been made in view of the problem, and an object of the present invention is to provide a monitoring device, a monitoring method, a program, and a recording medium each of which facilitates determination of prediction of trouble while preventing excessive reporting.

Solution to Problem

In order to attain the object, a monitoring device of the present invention includes: a physical quantity acquisition section for acquiring physical quantities indicative of a state of a monitoring target device; an abnormality determination section for determining, in accordance with whether or not the physical quantities acquired by the physical quantity acquisition section fall within a predetermined range, whether or not there is an abnormality; an abnormal waveform data generation section for, in a case where the abnormality determination section determines that there is an abnormality, generating abnormal waveform data indicative of a change over time in the physical quantities acquired during an abnormal waveform period containing at least a period from a point in time at which the abnormality determination section determines that there is an abnormality to a point in time at which a predetermined accumulation time elapsed; and a reporting section for causing a display section to display an abnormal waveform indicated by the abnormal waveform data generated by the abnormal waveform data generation section.

A monitoring method of the present invention includes the steps of: a) acquiring physical quantities indicative of a state of a monitoring target device; b) determining, in accordance with whether or not the acquired physical quantities fall within a predetermined range, whether or not there is an abnormality; c) in a case where it is determined that there is an abnormality, generating abnormal waveform data indicative of a change over time in the physical quantities acquired during an abnormal waveform period containing at least a period from a point in time at which it is determined that there is an abnormality to a point in time at which a predetermined accumulation time elapsed; and d) causing a display device to display an abnormal waveform indicated by the abnormal waveform data.

Advantageous Effects of Invention

As described earlier, a monitoring device, a monitoring method, a program, and a recording medium of the present invention each make it possible to facilitate determination of prediction of trouble while preventing excessive reporting.

DESCRIPTION OF EMBODIMENTS

<Overall Configuration of Monitoring System>

Figure 1:
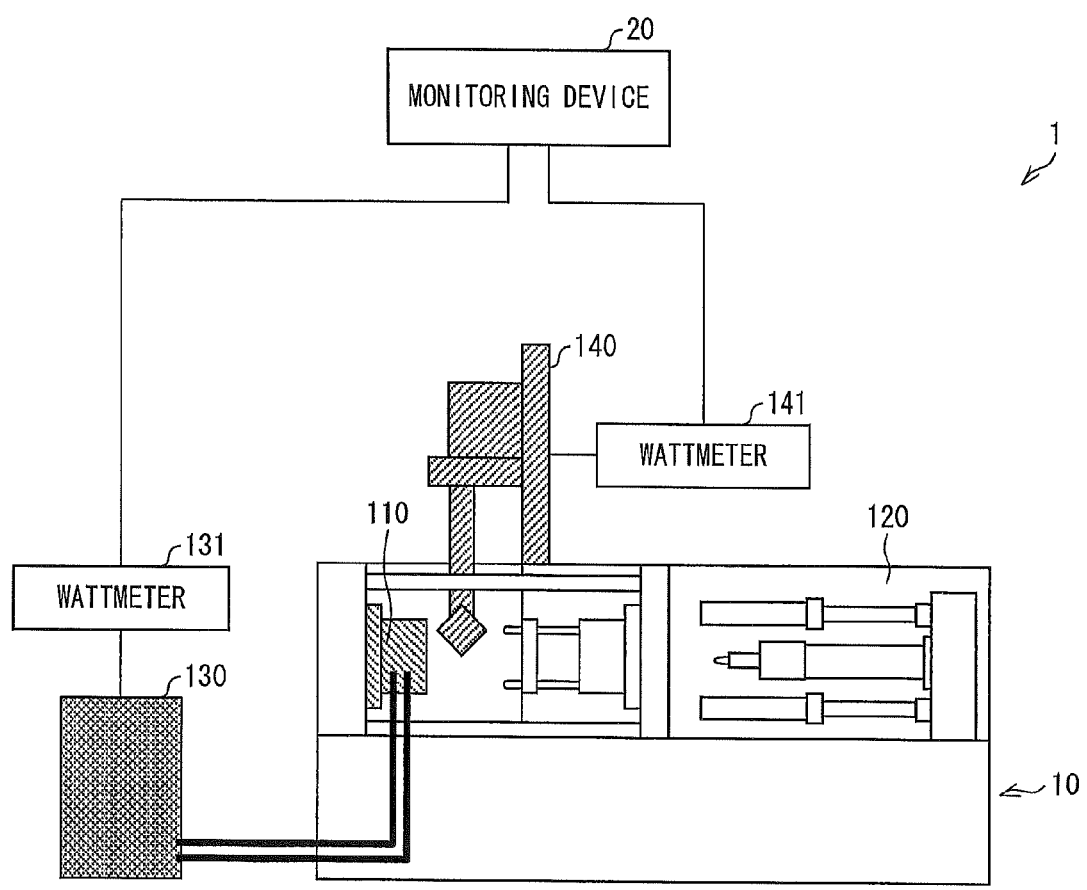
FIG. 1 schematically illustrates an overall configuration of a monitoring system in accordance with an embodiment of the present invention.

An embodiment of the present invention is specifically described below with reference to the drawings. FIG. 1 schematically illustrates an overall configuration of a monitoring system in accordance with an embodiment of the present invention. A monitoring system 1 in accordance with the present embodiment includes a monitoring device 20 which monitors an abnormality for predicting trouble with a device, and a production line 10 which includes a monitoring target device.

The production line 10, which is a line in which a resin molded article is processed, includes a mold 110, an injection molding machine 120 which injects a molten resin into the mold 110, a mold temperature controller 130 for maintaining the mold 110 at a temperature falling within a predetermined temperature range, and a taking out robot 140 for taking out a component molded by the mold 110 and carrying the component.

Note that the mold temperature controller 130 is a device which controls the temperature of the mold 110 by circulating a heating medium such as oil. Note also that the taking out robot 140 includes a drive motor and takes out a component by operation of the drive motor.

According to the monitoring device 20, the mold temperature controller 130 and the taking out robot 140 are monitoring target devices. In accordance with a physical quantity indicative of a state of each of the devices, the monitoring device 20 monitors presence or absence of an abnormality appearing as a sign of future trouble. However, the monitoring device 20 does not carry out abnormality reporting at a timing at which it is determined that there is an abnormality, but carries out abnormality reporting by preparing an abnormal waveform (graph) indicative of a change over time in physical quantity during a predetermined time containing the timing, and thereafter displaying the abnormal waveform.

Examples of a usable physical quantity indicative of a state of a device include various physical quantities such as a vibration, a temperature, a running torque, a pressure, an electric current value supplied to a device, and an amount of electric power consumption by a device. An electric current value and an amount of electric power consumption are physical quantities each of which is less likely to be influenced by, for example, a disturbance from an ambient environment of a device, means for measuring data, a measured part, and/or a measurement condition. According to the present embodiment, an amount of electric power consumption is used as a physical quantity. Thus, the mold temperature controller 130 and the taking out robot 140, which are the monitoring target devices, include a wattmeter 131 and a wattmeter 141, respectively. The wattmeters 131 and 141 (e.g., KM50, manufactured by OMRON Corporation) are provided in power supply circuit sections of the respective devices. The wattmeters 131 and 141 each include a current transformer which measures an electric current, a voltage transformer which measures a voltage, and a calculation section which calculates an electric power value by multiplying signals of the current transformer and the voltage transformer. The wattmeters 131 and 141 are connected with the monitoring device 20 and supply, to the monitoring device 20, electric power values measured at a predetermined time interval. The predetermined time interval can be appropriately set. Setting of the predetermined time interval as, for example, an interval of one minute makes it possible to specifically understand a change in value of electric power consumption.

<Example of Change Over Time in Physical Quantity>

Figure 2:
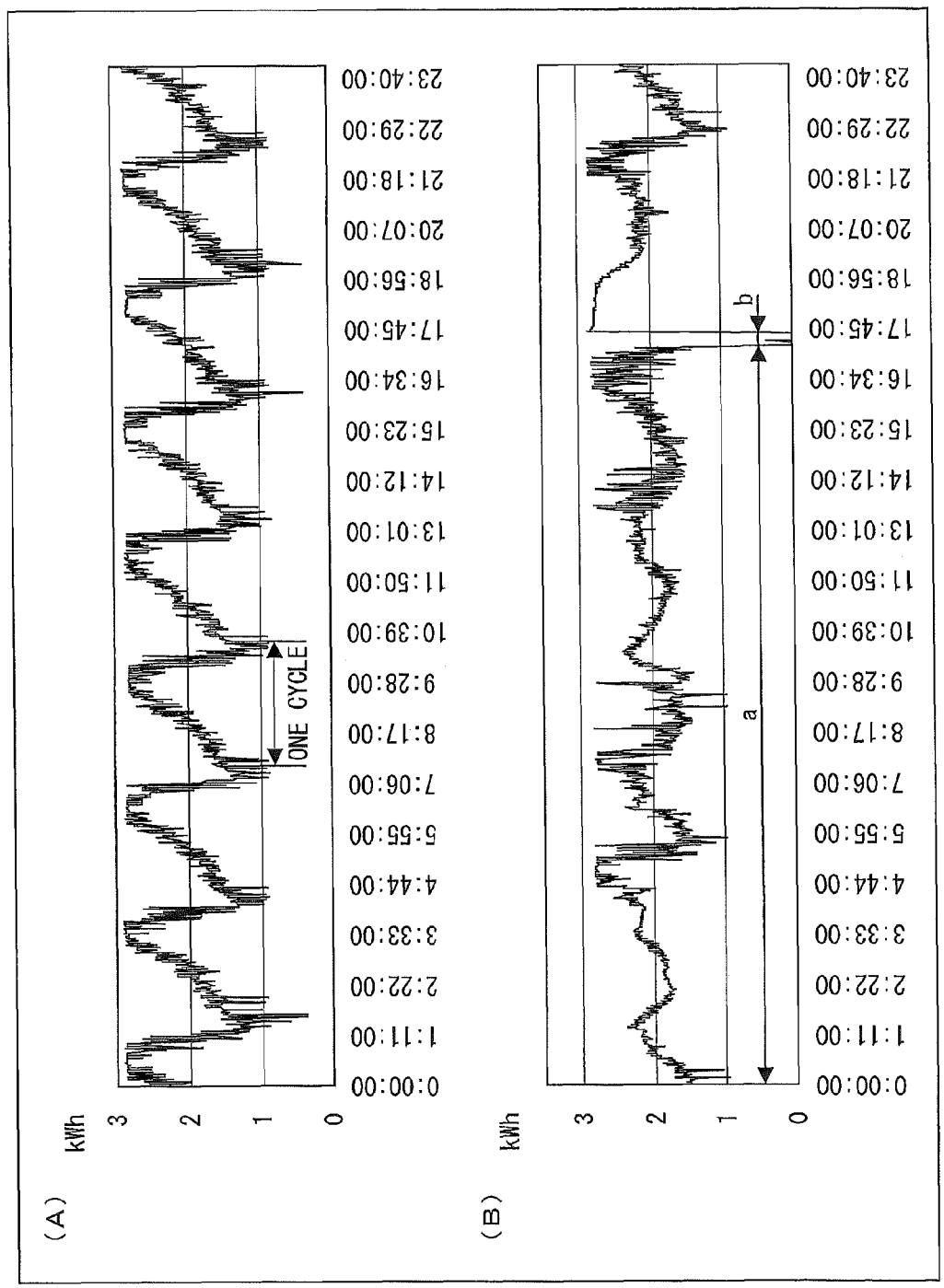
FIG. 2 shows an example of a change over time in amount of electric power consumption by a mold temperature controller illustrated in FIG. 1. (A) of FIG. 2 shows a waveform in a normal state, and (B) of FIG. 2 shows a waveform in an abnormal state.

Next, the following description discusses an example of a change over time in amount of electric power consumption, which amount is a physical quantity. FIG. 2 has waveforms for 24 hours in a case where amounts of electric power consumption by the mold temperature controller 130 are measured at an interval of one minute. (A) of FIG. 2 is a graph when the mold temperature controller 130 is in a normal state. As illustrated in (A) of FIG. 2, it is revealed that the amount of electric power consumption by the mold temperature controller 130 changes in a given cycle (in a cycle of approximately 2.5 hours in (A) of FIG. 2). This is because a heating heater is turned on/off at regular intervals in accordance with a temperature state of the mold 110.

Meanwhile, (B) of FIG. 2 is a waveform indicative of a change over time in amount of electric power consumption of the mold temperature controller 130 in which there occurs any abnormality. In (B) of FIG. 2, a period a is a period in which the heating heater is subjected to turning on/off control different from that carried out in the normal state, and a timing b is a timing at which maintenance of the device is carried out. In the period a, in which turning on/off control different from that carried out in the normal state is carried out, the amount of electric power consumption per cycle is large, and it is revealed that after the maintenance, the waveform is similar to that of the amount of electric power consumption in such a cycle as illustrated in (A) of FIG. 2.

Figure 3:
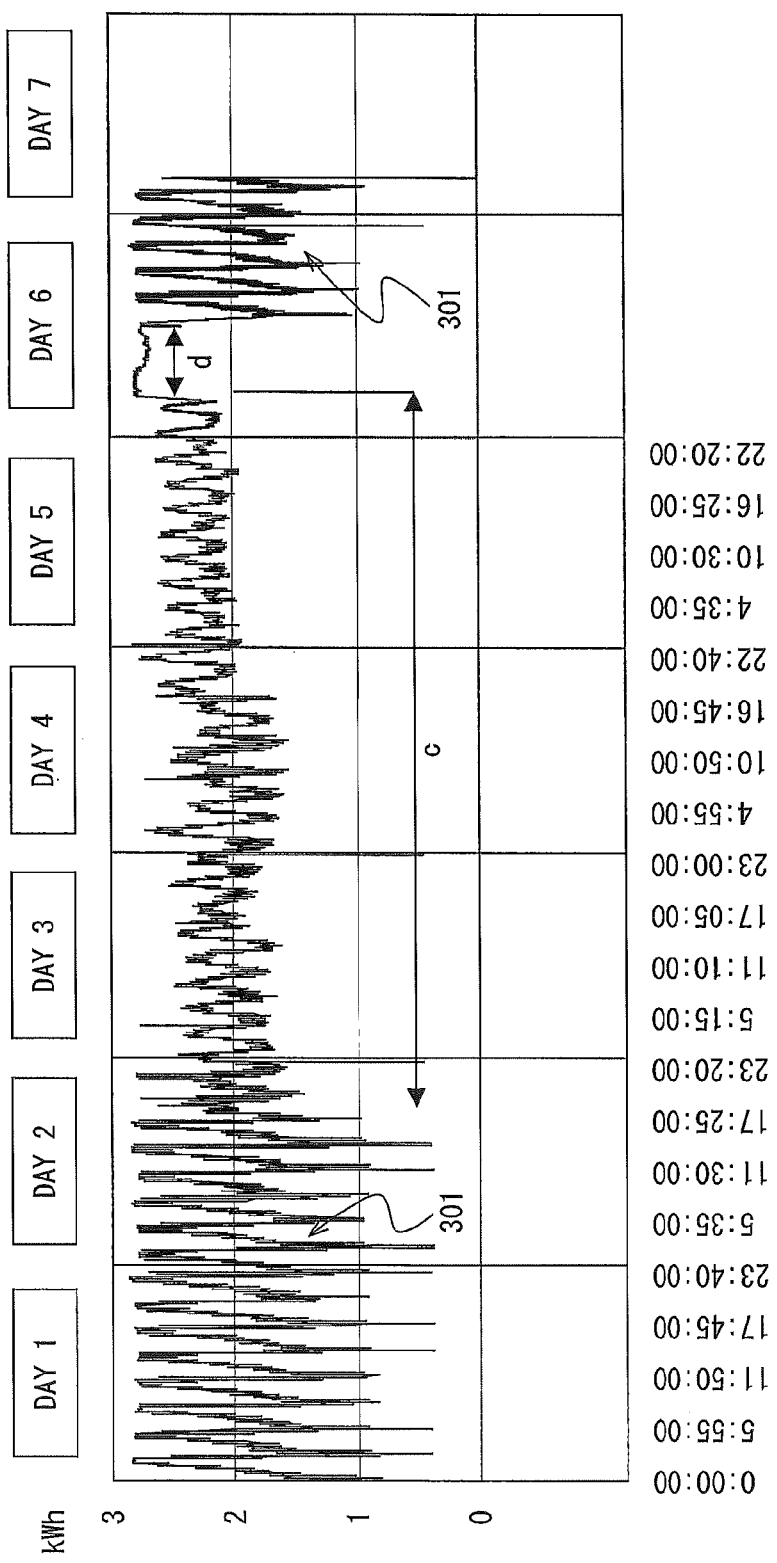
FIG. 3 shows another example of the change over time in amount of electric power consumption by the mold temperature controller illustrated in FIG. 1.

Also in such a state as illustrated in the period a of (B) of FIG. 2, a molding quality can be maintained provided that the temperature of the mold 110 is kept at a temperature falling within the predetermined temperature range. Note, however, that long-period continuance of the state as illustrated in the period of (B) of FIG. 2 means that a deterioration in molding quality and/or trouble with the mold temperature controller 130 or the mold 110 are/is highly likely to occur in the near future. FIG. 3 illustrates a state in which a waveform of the amount of electric power consumption in a state different from the normal state continues for three days (see a period c) and then the waveform returns to a normal waveform 301 by a repair of the device during a period d. In this case, the repair can be carried out at an earlier timing by letting a worker know as early as possible.

Figure 4:
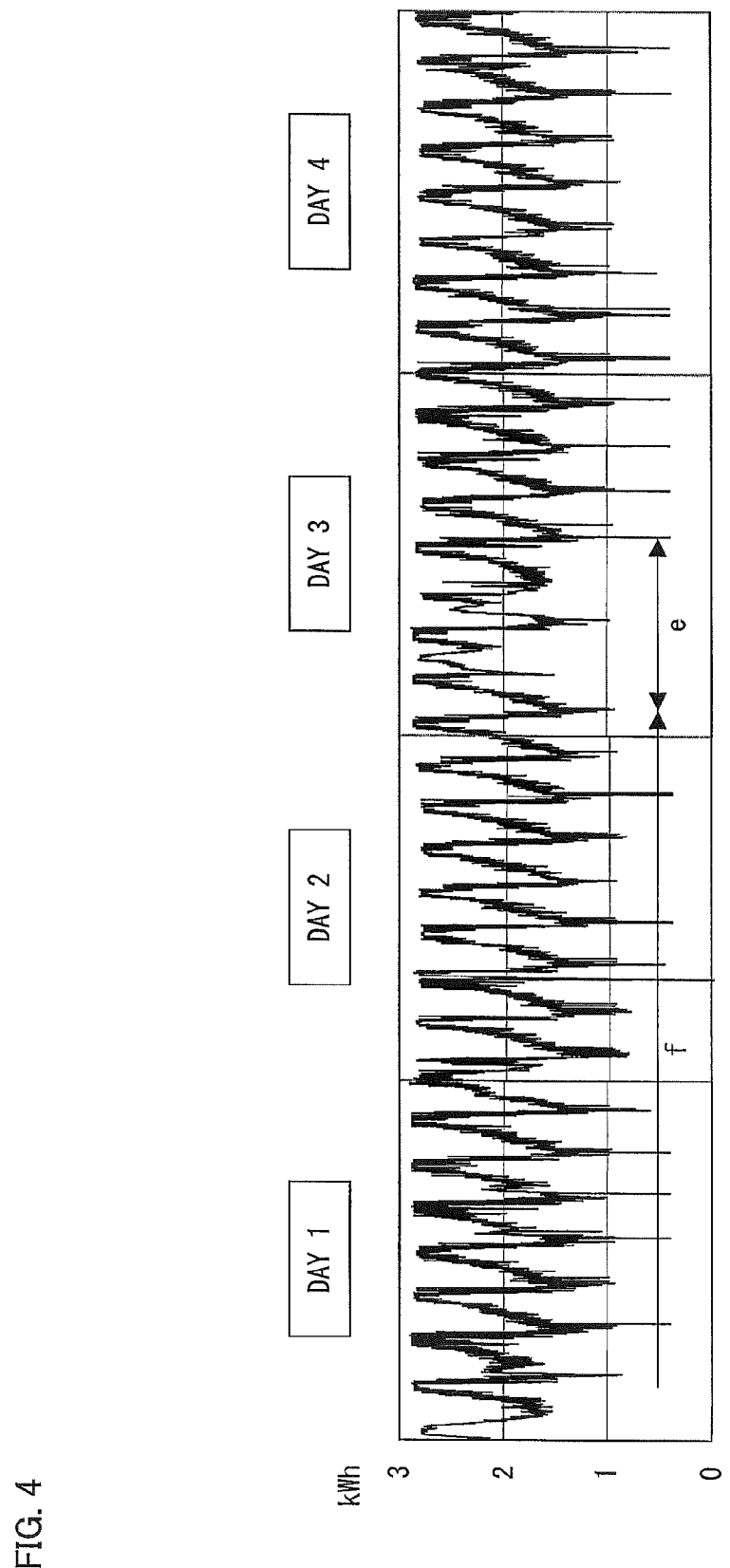
FIG. 4 shows still another example of the change over time in amount of electric power consumption by the mold temperature controller illustrated in FIG. 1.

Meanwhile, even in a case where such a state as illustrated in the period a of (B) of FIG. 2 temporarily arises, the state may naturally return to the normal state without the need for the worker to carry out a repair process. For example, in a case where clogging of somewhere in a pipe with a heating medium causes the state as illustrated in the period a, but thereafter the clogging is naturally solved and the heating medium is normally circulated, the state returns to the state of (A) of FIG. 2. FIG. 4 shows an example of a graph in a case where a waveform of the amount of electric power consumption temporarily shows an abnormality. As illustrated in FIG. 4, the waveform of the amount of electric power consumption in a period e differs from the waveform in a period f, which waveform is in the normal state, but after the period e, a state of the waveform returns to the normal state without any repair process carried out by the worker. In this case, abnormality reporting at a timing of the period e not only requires much time but also unnecessarily stops the device for investigation of a cause. This may cause a deterioration in production efficiency.

Note that such a temporal abnormality as illustrated in the period e may indicate a sign that trouble will occur in the far future. In a case where such an abnormality is confirmed, it is unnecessary to immediately respond to the device, but it is possible to prepare for trouble in advance.

Figure 5:
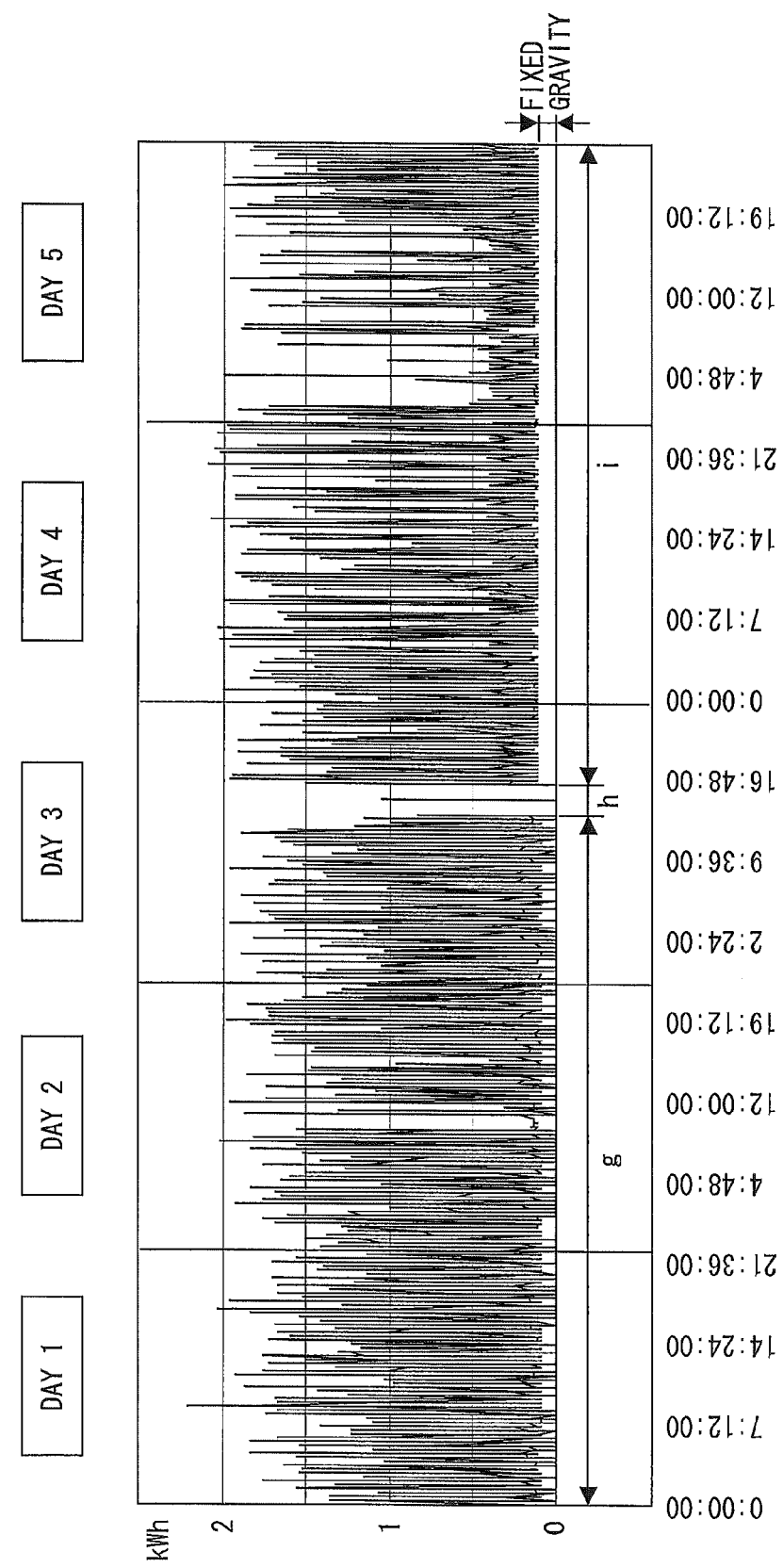
FIG. 5 shows an example of a change over time in amount of electric power consumption by a taking out robot illustrated in FIG. 1.

FIG. 5 is a graph showing a change over time in amount of electric power consumption by the taking out robot 140. Since the drive motor of the taking out robot 140 is in operation at all times in the normal state, electric power is accordingly constantly consumed as fixed electric power (a period i in FIG. 5). However, occurrence of an abnormality of a slight burning-in in the drive motor causes a state in which the amount of electric power consumption is completely 0 (a period g in FIG. 5). In this state, the taking out robot 140 is operated while turning on/off control is frequently carried out with respect to the drive motor. The production line 10 does not stop while the taking out robot 140 is in operation. However, in a case where the taking out robot 140 stops operating (has trouble) due to a worse burn-in state of the drive motor, the production line 10 including the taking out robot 140 stops in an emergency as illustrated in a period h. As illustrated in FIG. 5, the period g continues for two or more days. Thus, it is desirable to predict trouble with the drive motor during this period and carry out, for example, replacement of the drive motor in advance so as to avoid a state of an emergency stop.

<Configuration of Monitoring Device>

Figure 6:
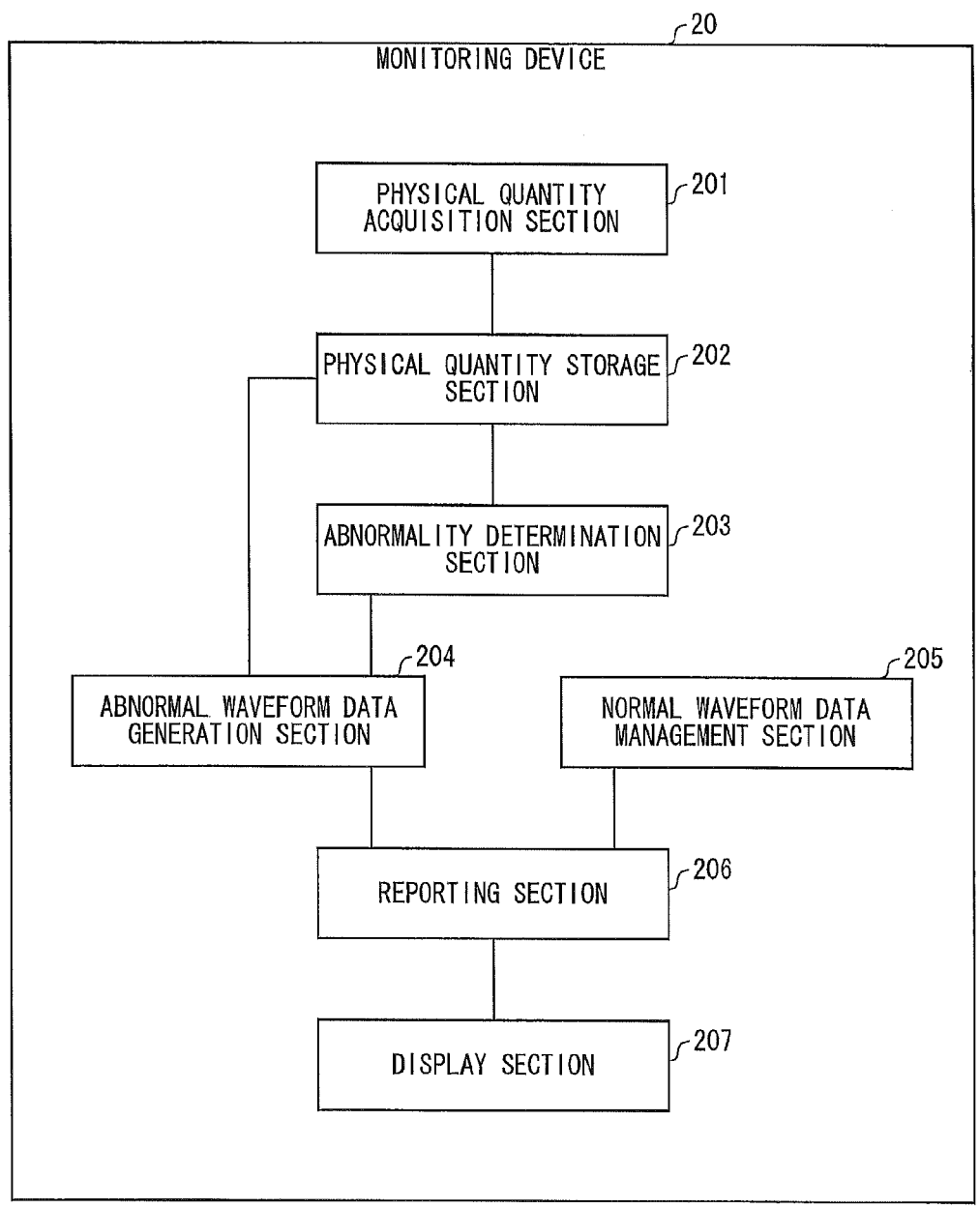
FIG. 6 is a block diagram illustrating a configuration of a monitoring device illustrated in FIG. 1.

FIG. 6 is a block diagram illustrating a configuration of the monitoring device 20 in accordance with the present embodiment. As illustrated in FIG. 6, the monitoring device 20 includes a display section 207, a physical quantity acquisition section 201, a physical quantity storage section 202, an abnormality determination section 203, an abnormal waveform data generation section 204, a normal waveform data management section 205, and a reporting section 206.

The display section 207 is, for example, display means such as an LCD (liquid crystal display), a PDP (plasma display), or an organic EL (electroluminescence) display.

The physical quantity acquisition section 201 acquires physical quantities indicative of a state of a monitoring target device at a predetermined time interval (e.g., an interval of one minute). According to the present embodiment, the physical quantity acquisition section 201 acquires the amounts of electric power consumption from each of the wattmeter 131 and the wattmeter 141, which are provided in the mold temperature controller 130 and the taking out robot 140, respectively. The physical quantity acquisition section 201 causes physical quantity data in which an acquired amount of electric power consumption and a time at which the acquired amount was measured are associated with each other to be stored in the physical quantity storage section 202 for each of the monitoring target devices.

Physical quantity data in which an amount of electric power consumption and a time at which the amount was measured are associated with each other is stored in the physical quantity storage section 202 for each of the devices. Only physical quantity data containing a measurement time within a predetermined retention period is stored in the physical quantity storage section 202. Physical quantity data corresponding to a measurement time out of the retention period is deleted from the physical quantity storage section 202 by the physical quantity acquisition section 201. The retention period is, for example, the last one week (i.e., a period from one week before this point in time to this point in time).

The abnormality determination section 203 determines, in accordance with whether or not a physical quantity acquired by the physical quantity acquisition section 201 falls within a predetermined range, whether or not there is an abnormality. For example, the mold temperature controller 130 showing the waveform of the amount of electric power consumption as illustrated in (A) of FIG. 2 ideally has a given accumulated amount (ideal accumulated amount) of electric power consumption for one cycle (2.5 hours to 3.0 hours). In view of this, the abnormality determination section 203 determines whether or not the accumulated amount of electric power consumption by the mold temperature controller 130 during a period between this point in time and a point in time that is one cycle before this point in time falls within the predetermined range (ideal accumulated amount±predetermined amount). In a case where the accumulated amount falls within the predetermined range, the abnormality determination section 203 only needs to determine that there is no abnormality. In a case where the accumulated amount is out of the predetermined range, the abnormality determination section 203 only needs to determine that there is an abnormality.

The taking out robot 140 showing a waveform of the amount of electric power consumption as illustrated in FIG. 5 consumes given fixed electric power at all times in a case where the taking out robot 140 is in a normal state. In view of this, the abnormality determination section 203 determines whether or not the latest amount of electric power consumption by taking out robot 140, the latest amount having been acquired by the physical quantity acquisition section 201, falls within a predetermined range (range being not less than fixed electric power). In a case where the latest amount of electric power consumption falls within the predetermined range, the abnormality determination section 203 only needs to determine that there is no abnormality. In a case where the latest amount of electric power consumption is out of the predetermined range, the abnormality determination section 203 only needs to determine that there is an abnormality.

Note that the abnormality determination section 203 stores in advance information indicative of a predetermined range serving as a criterion for determining whether or not there is an abnormality. The predetermined range is appropriately set in accordance with the waveform in a normal state in view of a property and/or a specification of a device. Further, a range which excludes a physical quantity appearing as a sign of possibility that trouble will occur in the future is set as the predetermined range. This makes it possible to predict trouble in advance.

In a case where the abnormality determination section 203 determines that there is an abnormality, by regarding a measurement time associated with the latest amount of electric power consumption as an abnormality confirmation time, the abnormality determination section 203 supplies, to the abnormal waveform data generation section 204, an abnormality occurrence signal containing the abnormality confirmation time and device identification information for identifying a device for which the abnormality determination section 203 has determined that there is an abnormality.

The abnormal waveform data generation section 204 which has received the abnormality occurrence signal waits for a predetermined accumulation time (e.g., two hours or one day) to elapse from the abnormality confirmation time. After the wait, the abnormal waveform data generation section 204 generates, as abnormal waveform data, physical quantity data measured, during an abnormal waveform period containing at least a period from the abnormality confirmation time to a point in time at which the accumulation time elapsed, by a device indicated by the device identification information, and supplies the abnormal waveform data thus generated to the reporting section 206. In this case, the abnormal waveform data generation section 204 supplies the abnormal waveform data which is associated with the device identification information contained in the abnormality occurrence signal.

For example, in a case where the accumulation time is two hours and the amounts of electric power consumption are acquired at an interval of one minute, abnormal waveform data containing at least 120 pieces of physical quantity data is generated.

The accumulation time is set shorter than the retention period. This allows the abnormal waveform data generation section 204 to generate abnormal waveform data by reading, from the physical quantity storage section 202, physical quantity data corresponding to the abnormal waveform period.

The abnormal waveform data generation section 204 may cause the abnormal waveform period to contain a predetermined period before the abnormality confirmation time. This makes it possible to confirm a change over time in physical quantity during a period before an abnormality is confirmed. In particular, in the case of the physical quantity showing the waveform as illustrated in (A) of FIG. 2, the abnormal waveform period preferably contains a period at least one cycle before the abnormality confirmation time. This allows the abnormal waveform data to contain physical quantity data from a point in time at which a waveform in a state different from the normal state starts occurring.

Note that the abnormal waveform data generation section 204 sets a flag indicating that data is being accumulated as "1" during a period from the abnormality confirmation time to an elapse of the accumulation time and the flag indicating that data is being accumulated is reset as "0" after the elapse of the accumulation time. Even in a case where the abnormal waveform data generation section 204 receives the abnormality occurrence signal while the flag indicating that data is being accumulated is set as "1", the abnormal waveform data generation section 204 ignores the abnormality occurrence signal and generates no abnormal waveform data corresponding to the abnormality occurrence signal.

For each of the monitoring target devices, the normal waveform data management section 205 stores in advance normal waveform data indicative of a change over time in physical quantity measured when the each of the monitoring target devices is in the normal state. In response to a request from the reporting section 206, the normal waveform data management section 205 supplies, to the reporting section 206, normal waveform data on a device specified by the request.

The reporting section 206 which has received the abnormal waveform data from the abnormal waveform data generation section 204 requests the normal waveform data management section 205 for normal waveform data on a device indicated by the device identification information associated with the abnormal waveform data, and the reporting section 206 acquires the normal waveform data. Then, the reporting section 206 carries out a process for causing an abnormal waveform indicated by the abnormal waveform data and a normal waveform indicated by the normal waveform data to be displayed on a single screen of the display section 207. According to this, by confirming the abnormal waveform, the worker can determine, for example, whether or not the abnormality is the one that needs to be remedied, how long the device can be operated, or whether or not there is a possibility that trouble will occur. Further, comparison between the normal waveform and the abnormal waveform makes it easy to understand a degree of the abnormality.

Further, the reporting section 206 preferably displays not only the abnormal waveform but also information on the device indicated by the device identification information associated with the abnormal waveform data (e.g., a name of the device, a name of another device operating in conjunction with the device, a specification such as rated electric power, a processing condition, an accumulated operating time, and maintenance information such as a maintenance manager). This allows the worker to easily acquire information for repairing the device.

In addition, the reporting section 206 preferably displays the abnormal waveform only in a predetermined display time period. For example, a time period such as an operation start time period (e.g., 7:00 to 9:00) or an operation finishing time during which the display section 207 is easily visible to the worker, who is near the monitoring device 20, is set as the display time period. This makes it possible to prevent confirmation of abnormality reporting from being omitted. Furthermore, an abnormality for which the abnormality determination section 203 determines that there is an abnormality is detected as a prediction of trouble, and thus the abnormality does not need to be immediately confirmed. This makes it possible to prevent a decrease in working efficiency which decrease occurs in a case where the worker distant from the monitoring device 20 confirms the abnormal waveform out of the display time period.

<Flow of Process Carried Out in Monitoring Device>

Next, the following description discusses a flow of a process carried out in the monitoring device 20. According to the monitoring device 20, the physical quantity acquisition section 201 acquires amounts of electric power consumption from the wattmeter of each of the devices at a predetermined time interval (e.g., an interval of one minute) and carries out, at all times, a physical quantity storage process for storing, in the physical quantity storage section 202, physical quantity data in which a measurement time and an amount of electric power consumption are associated with each other.

Figure 7:
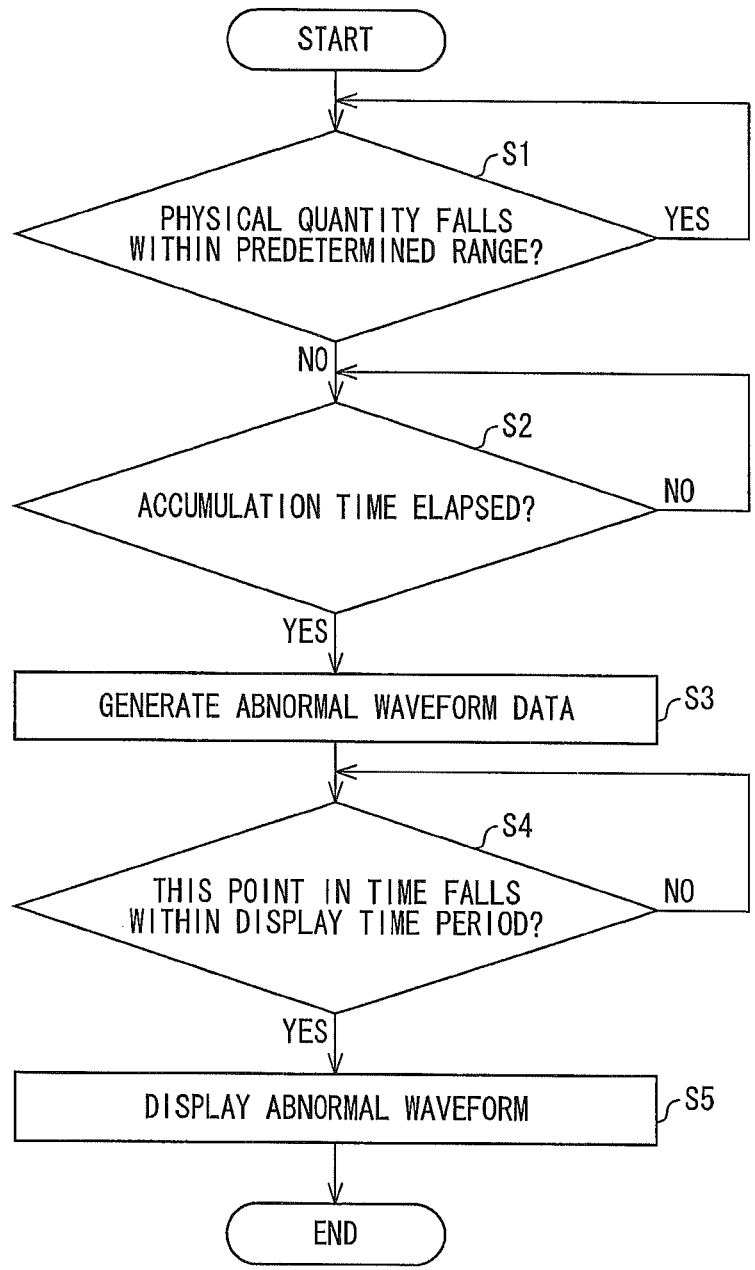
FIG. 7 is a flowchart showing a flow of an abnormality reporting process carried out in the monitoring device illustrated in FIG. 1.

FIG. 7 is a flowchart showing a flow of an abnormality reporting process carried out concurrently with the physical quantity storage process.

First, the abnormality determination section 203 determines whether or not the physical quantity data stored in the physical quantity storage section 202 falls within a predetermined range (specified range) (S1). In a case where the physical quantity falls within the predetermined range (i.e., in a case where there is no abnormality), the process returns to S1 again.

In a case where the physical quantity is out of the predetermined range (i.e., in a case where there is an abnormality), the abnormality determination section 203 supplies, to the abnormal waveform data generation section 204, the abnormality occurrence signal containing (i) the abnormality confirmation time, which is a time at which the latest amount of electric power consumption is measured and (ii) the device identification information for identifying the device for which the abnormality determination section 203 has determined that there is an abnormality. Then, the abnormal waveform data generation section 204 waits for a predetermined accumulation time to elapse from the abnormality confirmation time (S2). After the elapse of the accumulation time (Yes in S2), the abnormal waveform data generation section 204 generates, as the abnormal waveform data, the physical quantity data measured during the abnormal waveform period containing at least the period from the abnormality confirmation time to the point in time at which the accumulation time elapsed (S3). Then, the abnormal waveform data generation section 204 supplies the abnormal waveform data thus generated to the reporting section 206.

The reporting section 206 which has received the abnormal waveform data determines whether or not this point in time falls within a predetermined display time period (S4). In a case where this point in time is out of the display time period, the reporting section 206 waits for the display time period to come. In a case where this point in time falls within the display time period, the reporting section 206 acquires the normal waveform data from the normal waveform data management section 205 and causes the display section 207 to display the abnormal waveform indicated by the abnormal waveform data and the normal waveform indicated by the normal waveform data (S5). Note that the normal waveform data management section 205 stores the normal waveform data for a period identical to the abnormal waveform period.

Figure 8:
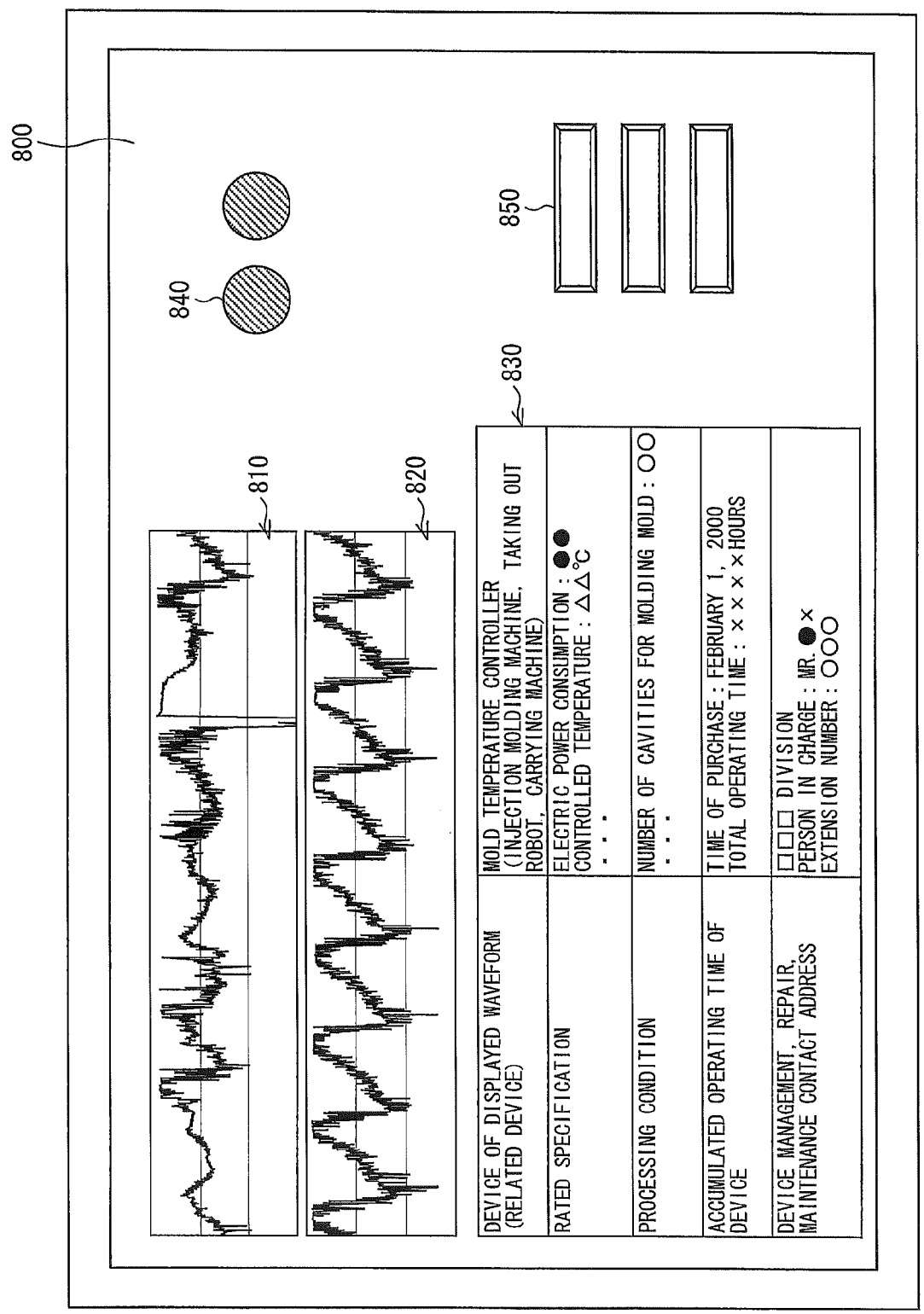
FIG. 8 shows an example of an abnormal waveform reporting screen displayed in the monitoring device illustrated in FIG. 1.

FIG. 8 shows an example of a reporting screen displayed in S5. As illustrated in FIG. 8, an abnormal waveform 810 and a normal waveform 820 are vertically juxtaposed on a reporting screen 800. Further, as illustrated in FIG. 8, the reporting section 206 causes a region 830 to display device related information related to a device showing the abnormal waveform 810. Alternatively, the reporting section 206 may turn on or turn on/off a lamp 840 notifying that the abnormal waveform 810 is being displayed. In addition, the reporting section 206 may cause various operation buttons 850 to be displayed so that the worker who confirms the abnormal waveform can easily carry out an operation such as an emergency shutdown of a device.

<Modification>

(1) According to the above description, the normal waveform data management section 205 stores the normal waveform data for a period identical to the abnormal waveform period. Note, however, that the period for the normal waveform data does not need to be identical to the abnormal waveform period. For example, in the case of the physical quantity that varies at regular intervals as illustrated in (A) of FIG. 2, the normal waveform data management section 205 may manage the normal waveform data for at least one cycle. Comparison with a normal waveform for one cycle allows the worker to confirm a degree of an abnormality in an abnormal waveform.

(2) According to the above description, the normal waveform data management section 205 stores the normal waveform data in advance. Note, however, the normal waveform data management section 205 may generate the normal waveform data from the physical quantity data retained in the physical quantity storage section 202.

For example, the abnormality determination section 203 sets an abnormality flag to the physical quantity data for which the physical quantity storage section 202 has determined that there is an abnormality. As in determination of presence or absence of an abnormality in the mold temperature controller 130, in the case of determining, in accordance with an accumulated amount of electric power consumption during a period between this point in time and a point in time that is a predetermined period (one cycle) before this point in time, whether or not there is an abnormality, the abnormality determination section 203 may set the abnormality flag to the accumulated physical quantity data.

The normal waveform data management section 205 which has received a request for the normal waveform data from the reporting section 206 searches the physical quantity data retained in the physical quantity storage section 202 for a physical quantity data group to which no abnormality flag is continuously set for a predetermined normal waveform period. Then, the normal waveform data management section 205 stores the physical quantity data group searched for as new normal waveform data and supplies the physical quantity data group to the reporting section 206. In a case where a plurality of physical quantity data groups are searched for, the normal waveform data management section 205 only needs to regard the latest physical quantity data group as the normal waveform data. In a case where no physical quantity data group to which no abnormality flag is continuously set for a predetermined normal waveform period exists in the physical quantity storage section 202, the normal waveform data management section 205 only needs to supply the stored normal waveform data (i.e., the normal waveform data generated last time) to the reporting section 206 without updating the normal waveform data. Note that the normal waveform period may be identical to or different from the abnormal waveform period as described earlier.

(3) According to the above description, the monitoring device 20 monitors a plurality of monitoring target devices. Note, however, that the monitoring device 20 may be provided to one monitoring target device. That is, the monitoring device 20 is separately provided to each of the mold temperature controller 130 and the taking out robot 140. The monitoring device 20 monitors only one corresponding device. In this case, the monitoring device 20 may include, as a physical quantity measurement section, a wattmeter for measuring a physical quantity of a monitoring target device and cause the physical quantity acquisition section 201 to acquire a physical quantity from the physical quantity measurement section.

(4) The above description takes, as an example of a monitoring target device, a production device such as the mold temperature controller 130. Note, however, that the monitoring target device may be a continuously operating device such as an air conditioner, an exhaust fan, a cooling water pump, or an air compressor. Such a device is also required to avoid a sudden stop of a device due to, for example, breakage or wear in a component as much as possible and to avoid an increase in amount of electric power consumption due to deterioration of a component. Therefore, by causing the monitoring device 20 of the present embodiment to confirm, before trouble occurs, an abnormal waveform which indicates that trouble may occur in the future, it is possible to prevent a sudden stop of a device and an increase in amount of electric power consumption.

(5) In FIG. 7, the determination step of S4 is carried out after the step of S3. However, the step of S4 may be omitted. For example, in a case where the worker is near the monitoring device 20, the abnormal waveform may be displayed at a timing at which the abnormal waveform data is prepared.

<Conclusion>

As described earlier, the monitoring device 20 of the present embodiment includes: the physical quantity acquisition section 201 for acquiring physical quantities indicative of a state of a monitoring target device; the abnormality determination section 203 for determining, in accordance with whether or not the physical quantities acquired by the physical quantity acquisition section 201 fall within a predetermined range, whether or not there is an abnormality; the abnormal waveform data generation section 204 for, in a case where the abnormality determination section 203 determines that there is an abnormality, generating abnormal waveform data indicative of a change over time in the physical quantities acquired during an abnormal waveform period containing at least a period from a point in time at which the abnormality determination section 203 determines that there is an abnormality to a point in time at which a predetermined accumulation time elapsed; and the reporting section 206 for causing the display section 207 to display an abnormal waveform indicated by the abnormal waveform data generated by the abnormal waveform data generation section 204.

According to this, by seeing the abnormal waveform, the worker can confirm whether or not a state of a physical quantity for which it was temporarily determined that there is an abnormality continues to be an abnormal state or has naturally returned to a normal state. This allows the worker (or a production manager) to easily determine whether or not the abnormality is the one that may cause future trouble with a device and requires any response, or the one that causes no future trouble and requires no response at this point in time. That is, the worker can easily determine prediction of trouble by confirming the abnormal waveform.

Further, according to the configuration, in which reporting is carried out after the physical quantities are accumulated for the accumulation time, reporting is carried out at a lower frequency as compared with a case where reporting is carried out every time it is determined that there is an abnormality, so that a decrease in working efficiency of the worker can be prevented. That is, excessive reporting can be prevented.

In addition, in a case where the predetermined range is set in accordance with a normal waveform, it is possible to completely detect an abnormal state. This makes it possible to predict trouble occurring from various causes.

In a case where this point in time falls within a predetermined display time period, the reporting section 206 causes the display section 207 to display the abnormal waveform.

Therefore, by setting, as a display time period, a time period in which the worker is near the monitoring device 20, it is possible to prevent the worker from missing the abnormal waveform. Further, the worker does not need to frequently confirm the abnormal waveform. In addition, the worker only needs to confirm the abnormal waveform only in the display time period, and does not need to carry out unexpected sudden confirmation, so that a decrease in working efficiency of the worker can be prevented.

As described earlier, a monitoring device of the present invention includes: a physical quantity acquisition section for acquiring physical quantities indicative of a state of a monitoring target device; an abnormality determination section for determining, in accordance with whether or not the physical quantities acquired by the physical quantity acquisition section fall within a predetermined range, whether or not there is an abnormality; an abnormal waveform data generation section for, in a case where the abnormality determination section determines that there is an abnormality, generating abnormal waveform data indicative of a change over time in the physical quantities acquired during an abnormal waveform period containing at least a period from a point in time at which the abnormality determination section determines that there is an abnormality to a point in time at which a predetermined accumulation time elapsed; and a reporting section for causing a display section to display an abnormal waveform indicated by the abnormal waveform data generated by the abnormal waveform data generation section.

A monitoring method of the present invention includes the steps of: a) acquiring physical quantities indicative of a state of a monitoring target device; b) determining, in accordance with whether or not the acquired physical quantities fall within a predetermined range, whether or not there is an abnormality; c) in a case where it is determined that there is an abnormality, generating abnormal waveform data indicative of a change over time in the physical quantities acquired during an abnormal waveform period containing at least a period from a point in time at which it is determined that there is an abnormality to a point in time at which a predetermined accumulation time elapsed; and d) causing a display device to display an abnormal waveform indicated by the abnormal waveform data.

According to the configuration, by seeing a change over time in the physical quantities accumulated during a period from a point in time at which it is determined that there is an abnormality to a point in time at which a predetermined accumulation time elapsed, the worker can confirm whether or not a state of a physical quantity for which it was temporarily determined that there is an abnormality continues to be an abnormal state or has naturally returned to a normal state. This allows the worker to easily determine whether or not the abnormality is the one that may cause future trouble with a device and requires any response, or the one that causes no future trouble and requires no response at this point in time. That is, the worker can easily determine prediction of trouble by confirming the abnormal waveform.

Further, according to the configuration, in which reporting is carried out after the physical quantities are accumulated for the accumulation time, reporting is carried out at a lower frequency as compared with a case where abnormality reporting is carried out every time it is determined that there is an abnormality, so that a decrease in working efficiency of the worker can be prevented. That is, excessive reporting can be prevented.

The monitoring device of the present invention is preferably configured such that, in a case where this point in time falls within a predetermined display time period, the reporting section causes the display section to display the abnormal waveform.

According to the configuration, by setting, as a display time period, a time period in which the worker is near the monitoring device, it is possible to prevent the worker from missing the abnormal waveform.

The monitoring device of the present invention is preferably configured such that the physical quantities are each an electric current value or an amount of electric power consumption.

An electric current value or an amount of electric power consumption is a physical quantity which is less influenced by, for example, an ambient environment of a device and/or a measurement condition. This allows a reduced frequency of erroneous determination of an abnormality due to an influence of, for example, an ambient environment of a device and/or a measurement condition.

The monitoring device of the present invention is preferably configured to further include: a normal waveform data management section for managing normal waveform data indicative of a change over time in the physical quantities in a normal state, the reporting section causing the abnormal waveform and a normal waveform indicated by the normal waveform data to be displayed on a single screen of the display section.

According to the configuration, comparison of the normal waveform and the abnormal waveform makes it possible to easily determine a degree of an abnormality.

The monitoring device of the present invention is preferably configured such that the normal waveform data management section generates the normal waveform data by extracting, from the physical quantities acquired by the physical quantity acquisition section, physical quantities for which the abnormality determination section continuously determines for a predetermined time that there is no abnormality.

Depending on a device, a normal waveform may also slightly change by use of the device for a long period. According to the configuration, a normal waveform in accordance with a current state can be displayed also for such a device.

Note that the abnormality determination section may determine, in accordance with whether or not an accumulated value of the physical quantities acquired by the physical quantity acquisition section during a period between this point in time and a point in time that is a predetermined time before this point in time falls within the predetermined range, whether or not there is an abnormality. Alternatively, the abnormality determination section may determine, in accordance with whether or not the latest physical quantity acquired by the physical quantity acquisition section falls within the predetermined range, whether or not there is an abnormality.

The monitoring method may be carried out by a computer. In this case, a control program for causing a computer to carry out each of the steps of the monitoring method and a computer-readable recording medium in which the control program is recorded are encompassed in the technical scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

Each section of the monitoring device 20 of each of the above embodiments can be achieved in a case where calculation means such as a CPU (Central Processing Unit) (not shown) executes a program stored in storage means such as a ROM (Read Only Memory) or a RAM (Random Access Memory) and controls input means such as a keyboard, output means such as a display, and communication means such as an interface circuit. Therefore, merely in a case where a computer including these means executes the program by reading a recording medium in which the program is recorded, it is possible to perform various functions and various processes of the monitoring device 20 of an embodiment of the present invention. Further, the various functions and the various processes can be performed by any computer by recording the program on a removable recording medium.

The recording medium may be a memory (not shown) for processing in a microcomputer. For example, the recording medium may be a program medium such as a ROM per se. Alternatively, the recording medium may be a program medium that can read by inserting the recording medium into a program reading device provided as an external storage device (not shown).

In either case, the stored program is preferably arranged to be executed by access by a microprocessor. Further, the program is preferably arranged to be read and then downloaded to a program storage area of the microcomputer. It is assumed that the download program is stored in advance in the main apparatus.

Note that the program medium is a recording medium arranged to be separable from the main body. The recording medium may be, for example, a tape, such as a magnetic tape or a cassette tape; a magnetic disk, such as a flexible disk or a hard disk, or a disk, such as CD/MO/MD/DVD; a card, such as an IC card (memory card); or semiconductor memories, such as a mask ROM, EPROM (Erasable Programmable Read Only Memory), EEPROM (Registered Trademark) (Electrically Erasable Programmable Read Only Memory), and flash ROM. All these recording media hold a program in a fixed manner.

Alternatively, it is desirable that a system configuration connectable to communication networks including the Internet cause a recording medium to carry a program in a flowing manner by downloading the program over a communication network.

Further, when the program is downloaded from a communication network in this manner, the download program is desirably stored in advance in the main apparatus or installed from another recording medium.

INDUSTRIAL APPLICABILITY

The present invention is usable in a monitoring device which monitors a device such as a production device that is continuously used for a long period.

REFERENCE SIGNS LIST

20 Monitoring device
130 Mold temperature controller
131, 141 Wattmeter 140 Taking out robot
201 Physical quantity acquisition section
202 Physical quantity storage section
203 Abnormality determination section
204 Abnormal waveform data generation section
205 Normal waveform data management section
206 Reporting section
207 Display section
800 Reporting screen
810 Abnormal waveform
820 Normal waveform

The invention claimed is:

1. A monitoring device comprising:
a physical quantity acquisition section for acquiring physical quantities indicative of a state of a monitoring target device;
an abnormality determination section for determining, in accordance with whether or not the physical quantities acquired by the physical quantity acquisition section fall within a predetermined range, whether or not there is an abnormality;
an abnormal waveform data generation section for, in a case where the abnormality determination section determines that there is an abnormality, generating abnormal waveform data indicative of a change over time in the physical quantities acquired during an abnormal waveform period containing at least a period from a point in time at which the abnormality determination section determines that there is an abnormality to a point in time at which a predetermined accumulation time elapsed;
a reporting section for causing a display section to display an abnormal waveform indicated by the abnormal waveform data generated by the abnormal waveform data generation section; and
a normal waveform data management section for managing normal waveform data indicative of a change over time in the physical quantities in a normal state,
the normal waveform data management section generating the normal waveform data by extracting, from the physical quantities acquired by the physical quantity acquisition section, physical quantities for which the abnormality determination section continuously determines for a predetermined time that there is no abnormality, and
the reporting section causing the abnormal waveform and a normal waveform indicated by the normal waveform data to be displayed on a single screen of the display section.

2. The monitoring device as set forth in claim 1, wherein, in a case where a current point in time falls within a predetermined display time period, the reporting section causes the display section to display the abnormal waveform.

3. The monitoring device as set forth in claim 1, wherein the physical quantities are each an electric current value or an amount of electric power consumption.

4. The monitoring device as set forth in claim 1, wherein the abnormality determination section determines, in accordance with whether or not an accumulated value of the physical quantities acquired by the physical quantity acquisition section during a period between a current point in time and a point in time that is a predetermined time before the current point in time falls within the predetermined range, whether or not there is an abnormality.

5. The monitoring device as set forth in claim 1, wherein the abnormality determination section determines, in accordance with whether or not the latest physical quantity acquired by the physical quantity acquisition section falls within the predetermined range, whether or not there is an abnormality.

6. A monitoring method comprising the steps of:
a) acquiring physical quantities indicative of a state of a monitoring target device;
b) determining, in accordance with whether or not the acquired physical quantities fall within a predetermined range, whether or not there is an abnormality;
c) in a case where it is determined that there is an abnormality, generating abnormal waveform data indicative of a change over time in the physical quantities acquired during an abnormal waveform period containing at least a period from a point in time at which it is determined that there is an abnormality to a point in time at which a predetermined accumulation time elapsed;
d) causing a display device to display an abnormal waveform indicated by the abnormal waveform data; and
e) managing normal waveform data indicative of a change over time in the physical quantities in a normal state,
the normal waveform data being generated in the step e) by extracting, from the physical quantities acquired in the step a), physical quantities for which it is continuously determined for a predetermined time in the step b) that there is no abnormality, and
in the step d), the abnormal waveform and a normal waveform indicated by the normal waveform data being displayed on a single screen of the display section.

7. A non-transitory computer-readable recording medium storing a control program for causing a computer to carry out each of the steps of the monitoring method recited in claim 6.

* * * * *